UNITED STATES PATENT OFFICE.

SAMUEL MILLER, OF LONDON, ENGLAND, ASSIGNOR TO EVELYN GLOVER, OF SAME PLACE.

ELECTROLYTE OR DEPOLARIZING SOLUTION FOR GALVANIC BATTERIES.

SPECIFICATION forming part of Letters Patent No. 468,887, dated February 16, 1892.

Application filed October 16, 1891. Serial No. 408,937. (No model.) Patented in England October 5, 1888, No. 14,323; in France September 30, 1889, No. 201,018, and in Austria-Hungary September 19, 1890, No. 16,200 and No. 36,246.

*To all whom it may concern:*

Be t known that I, SAMUEL MILLER, engineer, a subject of the Queen of Great Britain and Ireland, residing at 1 Langton Cottages, Melbourne Square, Brixton, in the county of Surrey, England, have invented an Improved Electrolyte or Depolarizing Solution for Galvanic Batteries, (for which I have obtained patents in Great Britain, No. 14,323, dated October 5, 1888; in France, No. 201,018, dated September 30, 1889, and in Austria-Hungary, No. 16,200 and No. 36,246, dated September 19, 1890,) of which the following is a specification.

This invention has for its object to provide an improved electrolyte or depolarizing solution more especially intended for use in a two-liquid battery of the kind described in the specification of my application for a patent for an improved galvanic cell or battery for electric lighting and for other purposes, the said application being of even date herewith.

The said electrolyte or depolarizing solution consists of or contains nitrate of soda, bichromate of potash, chloride of sodium, and sulphuric acid or hydrochloric acid, or both such acids.

This solution may be prepared as follows: In one quart of cold water I dissolve half a pound of nitrate of soda and two ounces of bichromate of potash, and to this solution I add fifteen fluid ounces of sulphuric acid or hydrochloric acid, or a mixture of such acids, it being added slowly, so as to generate as little heat as possible. When this solution is quite cold, I add two ounces of chloride of sodium.

I also find that it can be very satisfactorily prepared in the following way: To one quart of cold water I add gradually one pint of sulphuric acid or hydrochloric acid, or a mixture of the two acids, and I allow the solution to cool, preferably to 75° Fahrenheit. I then add six ounces of finely-powdered nitrate of soda and one and a half ounces of finely-powdered bichromate of potash. The mixture is then thoroughly stirred until the solids are dissolved, and then one ounce of chloride of sodium is added. The whole may then be finally stirred. The ingredients named may be those which are procurable as commercial products.

The foregoing solution is more especially suitable for the larger class of batteries. If the batteries be of the smaller kind—such as for miners' lamps—it is preferred to use four ounces each of the nitrate of soda and the bichromate of potash.

It will be seen from the foregoing directions that the proportions used may be varied somewhat to suit different cases; but any of the above proportions will enable the good results of my invention to be obtained, although the proportions which in any individual case will produce the maximum efficiency will not be the same in all cases.

I am aware that an electrolyte composed of bichromate of potash, chloride of sodium, and sulphuric acid, (without nitrate of soda,) and also an electrolyte composed of bichromate of potash, nitrate of soda, and sulphuric acid, (without chloride of sodium,) have heretofore been used. I have tried both of these solutions and have found that the electrolyte described and claimed herein yields far better results than either. The use of the solution herein described has the effect of diminishing polarization (thereby prolonging the effective action of the battery) and maintaining a more constant electro-motive force.

Having now particularly described and ascertained the nature of my said invention and in what manner the same is to be performed, I declare that what I claim is—

1. An electrolyte or depolarizing solution consisting of or containing nitrate of soda, bichromate of potash, chloride of sodium, and a suitable acid, substantially as set forth.

2. Electrolytes or depolarizing solutions consisting of or containing nitrate of soda, bichromate of potash, chloride of sodium, and a suitable acid, substantially in the proportions and prepared as hereinbefore described.

In testimony whereof I have signed my name to this specification in the presence of two subscribing witnesses.

SAMUEL MILLER.

Witnesses:
   CHAS. MILLS,
   ARTHUR J. NASH,
*Both of 47 Lincoln's Inn Fields, London, W. C.*